(12) United States Patent
Iwai et al.

(10) Patent No.: US 11,028,620 B2
(45) Date of Patent: Jun. 8, 2021

(54) DOOR STRUCTURE

(71) Applicant: HONDA MOTOR CO., LTD., Tokyo (JP)

(72) Inventors: Yutaka Iwai, Wako (JP); Nobuyuki Kishikawa, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 123 days.

(21) Appl. No.: 16/315,317

(22) PCT Filed: Jul. 5, 2017

(86) PCT No.: PCT/JP2017/024601
§ 371 (c)(1),
(2) Date: Jan. 4, 2019

(87) PCT Pub. No.: WO2018/008671
PCT Pub. Date: Jan. 11, 2018

(65) Prior Publication Data
US 2019/0153754 A1    May 23, 2019

(30) Foreign Application Priority Data
Jul. 8, 2016   (JP) .............................. JP2016-136283

(51) Int. Cl.
*E05B 77/34* (2014.01)
*E05B 81/76* (2014.01)
(Continued)

(52) U.S. Cl.
CPC ................. *E05B 77/34* (2013.01); *B60J 5/00* (2013.01); *B60J 5/04* (2013.01); *B60R 25/24* (2013.01);
(Continued)

(58) Field of Classification Search
CPC .......... E05B 77/34; E05B 81/64; E05B 81/76; E05B 81/77; E05B 81/78
See application file for complete search history.

(56) References Cited

U.S. PATENT DOCUMENTS 7,091,823 B2 *   8/2006   Ieda .................... E05B 81/78
                                                    292/336.3
7,422,258 B2 *   9/2008   Schindler .......... B29C 45/14639
                                                    296/1.02
(Continued)

FOREIGN PATENT DOCUMENTS

CN         101275444 A      10/2008
DE    102004025054 A1 *    12/2005    ............. E05B 81/76
(Continued)

OTHER PUBLICATIONS

International Search Report by ISA/JP dated Aug. 8, 2017, on PCT/JP2017/024601 (5 pages).
(Continued)

*Primary Examiner* — Carlos Lugo
(74) *Attorney, Agent, or Firm* — Rankin, Hill & Clark LLP (57) ABSTRACT

A door structure configured so that a sensor within an outer handle can be protected against water. A door structure for a vehicle is provided with: a first cover member constituting the outer surface of an outer handle; a sensor for detecting the approach of a user to the first cover member or the contact of the user with the first cover member; a marker provided on the outer surface of the first cover member at a location overlapping a region to be detected by the sensor; and a shield section provided between the sensor and the marker.

6 Claims, 5 Drawing Sheets

(51) Int. Cl.
    *E05B 85/16*           (2014.01)
    *B60R 25/24*           (2013.01)
    *B60J 5/00*            (2006.01)
    *B60J 5/04*            (2006.01)
    *E05B 81/64*           (2014.01)

(52) U.S. Cl.
    CPC .............. *E05B 81/76* (2013.01); *E05B 81/77* (2013.01); *E05B 85/16* (2013.01); *E05B 81/64* (2013.01); *E05Y 2900/531* (2013.01)

(56) References Cited

U.S. PATENT DOCUMENTS

| | | | | |
|---|---|---|---|---|
| 7,559,120 | B2* | 7/2009 | Fujiwara | B29C 45/14639 16/412 |
| 7,654,147 | B2* | 2/2010 | Witte | E05B 81/78 73/781 |
| 8,454,062 | B2* | 6/2013 | Rohlfing | E05B 81/78 292/336.3 |
| 8,636,309 | B2* | 1/2014 | Muller | E05B 81/78 292/336.3 |
| 8,830,659 | B2* | 9/2014 | Castandet | E05B 81/78 361/679.01 |
| 9,108,591 | B2* | 8/2015 | Ieda | E05B 81/78 |
| 9,447,604 | B2* | 9/2016 | Witte | E05B 17/22 |
| 10,253,530 | B2* | 4/2019 | Savant | E05B 81/76 |
| 2004/0075531 | A1* | 4/2004 | Ieda | B60R 25/246 340/5.72 |
| 2007/0115191 | A1* | 5/2007 | Hashiguchi | H01Q 1/3283 343/713 |
| 2008/0061933 | A1 | 3/2008 | Ieda et al. | |
| 2008/0246293 | A1 | 10/2008 | Fujiwara et al. | |
| 2010/0019510 | A1 | 1/2010 | Ieda et al. | |
| 2010/0187838 | A1* | 7/2010 | Ieda | E05B 85/16 292/336.3 |
| 2012/0133159 | A1* | 5/2012 | Tateishi | E05B 81/77 292/336.3 |
| 2012/0133563 | A1* | 5/2012 | Naka | E05B 81/77 343/713 |
| 2014/0246873 | A1* | 9/2014 | Raulin | E05B 81/78 292/336.3 |

FOREIGN PATENT DOCUMENTS

| | | | | |
|---|---|---|---|---|
| DE | 102005041551 | * | 3/2007 | |
| FR | 2360727 | A1 * | 3/1978 | ............. E05B 77/34 |
| JP | 2008-069536 | | 3/2008 | |
| JP | 2009-030358 | A | 2/2009 | |
| JP | 2009-133158 | A | 6/2009 | |
| JP | 2010-024797 | A | 2/2010 | |
| JP | 2012-112201 | A | 6/2012 | |

OTHER PUBLICATIONS

Written Opinion by ISA/JP dated Aug. 8, 2017, on PCT/JP2017/024601 (4 pages).
Japanese Office Action dated Sep. 30, 2019, English translation included, 5 pages.
Extended European Search Report of corresponding EP Application No. 17824274.9 dated Jun. 26, 2019 (7 pages).
Office Action received in corresponding CN application No. 201780041792.9 dated Apr. 1, 2021 with English translation (11 pages).

* cited by examiner

DOOR STRUCTURE

TECHNICAL FIELD

The present invention relates to a door structure of a vehicle body in which a sensor is provided in an outer handle.

BACKGROUND ART

In a vehicle door, a sensor is provided in a door handle on an outside of a vehicle body (see Patent Literature 1). Such a sensor detects that a user grips the outer handle. The detection result of the sensor is used for unlocking control of the door.

CITATION LIST

Patent Literature

Patent Literature 1: Japanese Patent Application Publication No. 2009-133158

SUMMARY OF INVENTION

Technical Problem

In the door handle disclosed in Patent Literature 1, a sensor in a housing of the door handle is provided below an upper wall of the housing. When rainwater or the like enters inside the housing, there is a risk that the sensor gets wet with the water and a sensing failure occurs.

The present invention is made in view of the abovementioned points and has an object to provide a door structure that can protect a sensor in an outer handle from water.

Solution to Problem

To solve the above problems, a door structure of the present invention is a door structure of a vehicle body including an outer handle, including: a cover member that forms an outer surface of the outer handle; a sensor that detects approach of a user to the cover member or contact of the user with the cover member; a marker that is provided on a portion of an outer surface of the cover member coinciding with a detection area of the sensor; and a shield that is provided between the sensor and the marker.

Advantageous Effects of Invention

According to the present invention, it is possible to protect a sensor in an outer handle from water.

DESCRIPTION OF EMBODIMENT

An embodiment of the present invention will be described with reference to the accompanying drawings using an example case in which a door structure of the present invention is applied to a door on a right surface of a vehicle body. In the descriptions, the same elements are denoted by the same reference signs, and duplicated descriptions are omitted. Note that "front and rear," "top and bottom," and "right and left" indicated by arrows in each drawing respectively represent a vehicle front-rear direction, a vehicle top-bottom direction, and a right-left direction viewed from a driver seat (vehicle-width direction).

<Vehicle Body Front Portion Structure>

Figure 1:
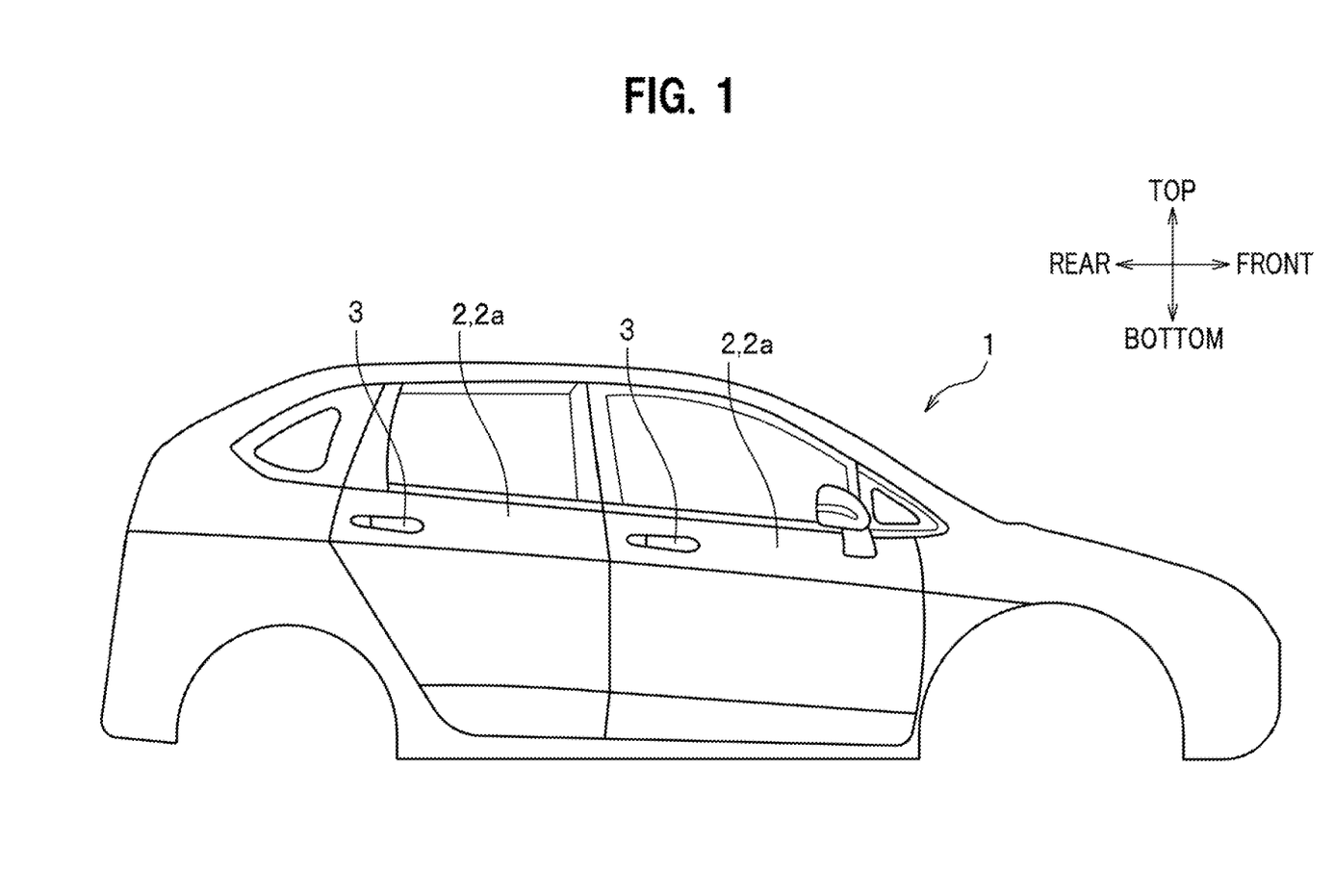
FIG. 1 is a side view that illustrates a vehicle body applied with a door structure according to an embodiment of the present invention.

As illustrated in FIG. 1, a door structure 1 of a vehicle body according to an embodiment of the present invention includes a door body 2 and an outer handle 3.

<Door Body>

The door body 2 opens and closes a door opening formed on a side surface of the vehicle body. The door body 2 is pivotally supported by a frame on a front side of the door opening of the vehicle body. The door body 2 is made of a combination of a metal-made outer panel (also referred to as a door skin) 2a, an unillustrated metal-made inner panel, and an unillustrated interior material applied on an inner surface in the vehicle-width direction of the inner panel. A space is formed between the outer panel 2a and the inner panel. In addition, through-holes through which a later-described hinge 36 and interlocking portion 37 (see FIG. 3) of a base member 30 are respectively inserted are formed in the outer panel 2a.

<Outer Handle>

The outer handle 3 is an operating portion to allow a user to operate opening and closing of the door body 2 from outside the vehicle. The outer handle 3 is provided below a window glass at a rear end of the door body 2. As illustrated in FIGS. 2 to 5, the outer handle 3 includes a first cover member 10, a second cover member 20, the base member 30, a reinforcement member 40, a water stop member 50, a sensor 60, a controller 70, a stopper 80, and a sheet base 90.

<<First Cover Member>>

Figure 2:
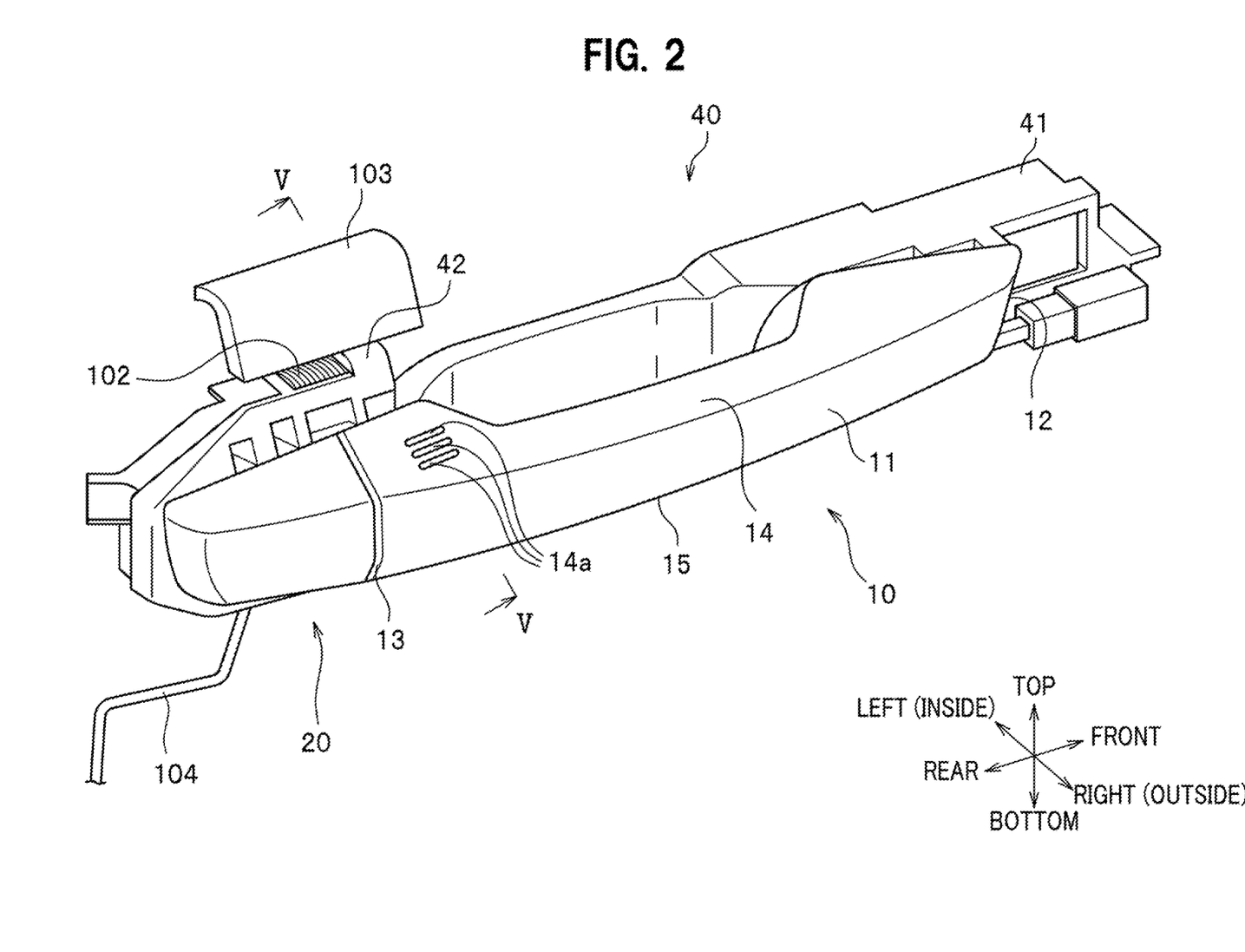
FIG. 2 is a perspective view that illustrates an outer handle of the door structure according to the embodiment of the present invention.

As illustrated in FIG. 2, the first cover member 10 is a resin-made member or a metal-made member provided on an outside in the vehicle-width direction of the outer panel 2a. The first cover member 10 is formed from a polycarbonate (PC) and a polyethylene terephthalate (PET), for example. The first cover member 10 is provided to extend in the front-rear direction and has an opening in an inner side in the vehicle-width direction. A part of the base member 30, the water stop member 50, the sensor 60, and the controller 70 are stored in the first cover member 10. A front end of the first cover member 10 is provided on the outside in the vehicle-width direction of a through-hole at a front side of the door body 2 and is coupled with a front end of the base member 30. A middle portion of the first cover member 10 is spaced outward in the vehicle-width direction from the outer panel 2a. A rear end of the first cover member 10 is provided on an outside in the vehicle-width direction of a through-hole 2b at a rear side of the door body 2 (see FIG. 5), and is abutted on an outer surface in the vehicle-width direction of the outer panel 2a when the outer handle 3 is not operated. The first cover member 10 integrally includes an outer wall 11, a front wall 12, a rear wall 13, an upper wall 14, and a lower wall 15.

The outer wall 11 is provided to extend in the front-rear direction. The front wall 12 is provided to extend inward in the vehicle-width direction from a front end of the outer wall 11. The rear wall 13 is provided to extend inward in the vehicle-width direction from a rear end of the outer wall 11. The upper wall 14 is provided to extend inward in the vehicle-width direction from an upper end of the outer wall 11. A front end of the upper wall 14 is coupled with an upper end of the front wall 12, and a rear end of the upper wall 14 is coupled with an upper end of the rear wall 13. The lower wall 15 is provided to extend inward in the vehicle-width direction from a lower end of the outer wall 11. A front end of the lower wall 15 is coupled with a lower end of the front wall 12, and a rear end of the lower wall 15 is coupled with a lower end of the rear wall 13.

Markers 14*a* are provided on the upper wall 14. The markers 14*a* are provided on a portion coinciding with a detection region of the sensor 60 (see FIGS. 4 and 5). The markers 14*a* are for indicating the detection region of the sensor 60 to the user outside the vehicle. In this embodiment, the markers 14*a* are multiple (three) parallel linear protrusions extending in the front-rear direction.

Note that the markers 14*a* are not limited to the above-mentioned multiple linear protrusions, and may be indicia such as paintings and stickers with a color different from the surroundings of the markers 14*a* of the first cover member 10.

<<Second Cover Member>>

The second cover member 20 is a resin-made or metal-made member provided at the rear of the first cover member 10 on the outside in the vehicle-width direction of the outer panel 2*a*. Likewise the first cover member 10, the second cover member 20 is formed from a polycarbonate (PC) and a polyethylene terephthalate (PET), for example. The second cover member 20 has an opening in an inside in the vehicle-width direction. An unillustrated lock is provided across an inside of the second cover member 20 and the space between the outer panel 2*a* and the inner panel. Such a lock can be switched between a locking state in which the door body 2 of the vehicle body is fixed and unable to be opened and closed and an unlocking state in which the door body 2 of the vehicle body is able to be opened and closed by using a smart key of the vehicle.

<<Base Member>>

Figure 3:
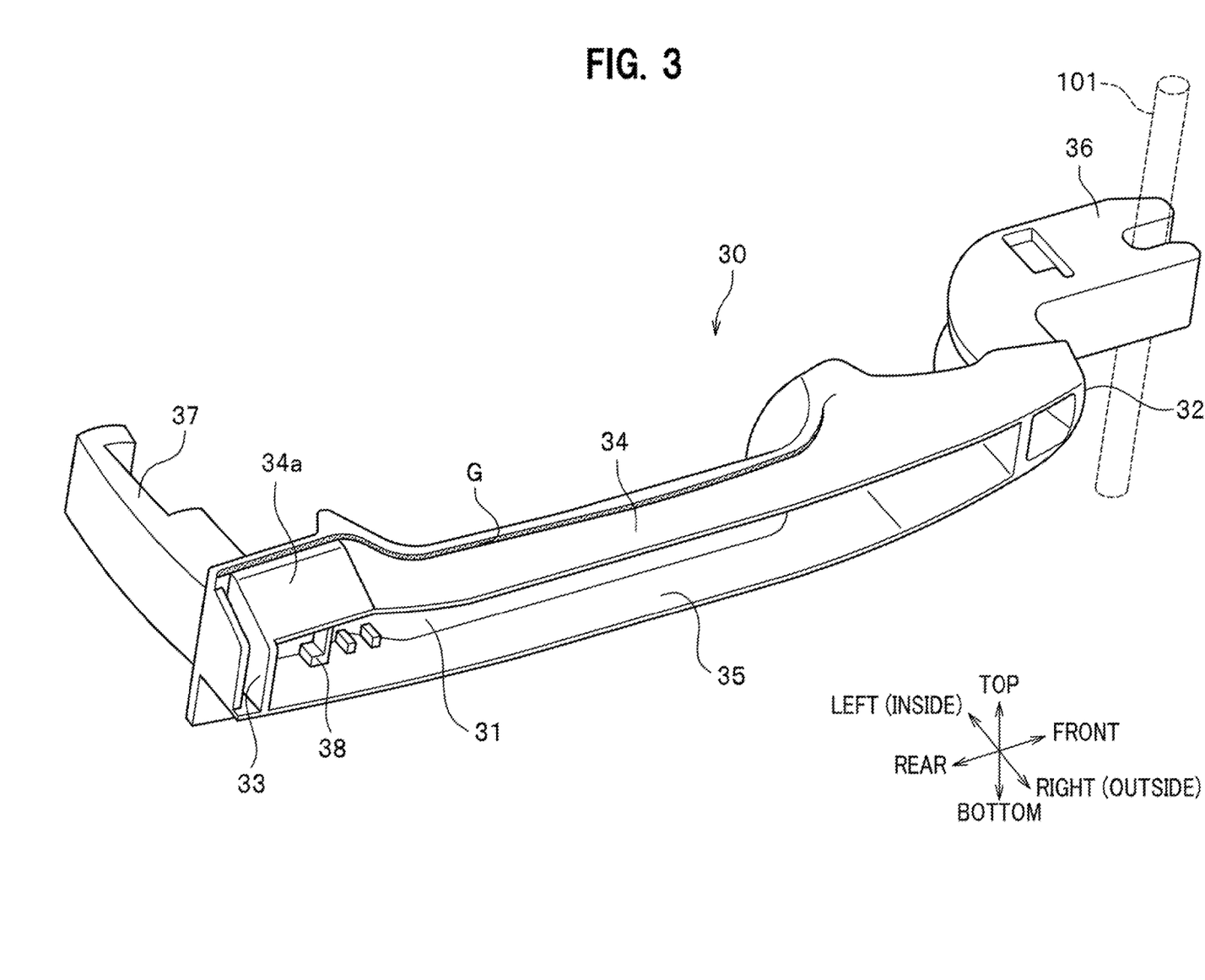
FIG. 3 is a perspective view that illustrates a base member of the door structure according to the embodiment of the present invention.

As illustrated in FIG. 3, the base member 30 is a resin-made member stored across an inside of the first cover member 10 and the space between the outer panel 2*a* and the inner panel. The base member 30 is formed from RENY in which a polyamide (PAMXD6) is used as a base resin, for example. The base member 30 is a main body of the outer handle operated by the user outside the vehicle. The base member 30 is provided to extend in the front-rear direction and has an opening in an outer side in the vehicle-width direction. The sensor 60 and the controller 70 are stored in the base member 30. The base member 30 integrally includes an inner wall 31, a front wall 32, a rear wall 33, an upper wall 34, and a lower wall 35 as portions stored in the first cover member 10.

The inner wall 31 is provided to extend in the front-rear direction. An upper end of the inner wall 31 is abutted on a lower surface of the upper wall 14 of the first cover member 10, and a lower end of the inner wall 31 is abutted on an upper surface of the lower wall 15 of the first cover member 10. The front wall 32 is provided to extend outward in the vehicle-width direction from a front end of the inner wall 31. The rear wall 33 is provided to extend outward in the vehicle-width direction from a rear portion of the inner wall 31. The upper wall 34 is provided to extend outward in the vehicle-width direction from an upper end of the inner wall 31. A front end of the upper wall 34 is coupled with an upper end of the front wall 32, and a rear end of the upper wall 34 is coupled with an upper end of the rear wall 33. The lower wall 35 is provided to extend outward in the vehicle-width direction from a lower portion of the inner wall 31. A front end of the lower wall 35 is coupled with a lower end of the front wall 32, and a rear end of the lower wall 35 is coupled with a lower end of the rear wall 33.

The rear end of the upper wall 34 includes a shield 34*a*. The shield 34*a* is abase upper wall provided between the markers 14*a* and a sensor upper wall 61 of the sensor 60 (see FIGS. 4 and 5). That is, the shield 34*a* is integrally provided on the base member 30.

In the vicinity of the shield 34*a*, the inner wall 31 includes an outer upper end 31*a* that continues at the same height with an inner end in the vehicle-width direction of the shield 34*a* and an inner upper end 31*b* that is formed at a higher position than the position of the outer upper end 31*a*. The inner upper end 31*b* is abutted on the lower surface of the upper wall 14 of the first cover member 10.

The base member 30 integrally includes the hinge 36 and the interlocking portion 37 as portions projecting from the first cover member 10 and stored in the reinforcement member 40 (see FIG. 2).

The hinge 36 is provided to extend inward in the vehicle-width direction from the front end of the inner wall 31. A tip end of the hinge 36 is pivotally supported by a handle shaft 101 provided in the space between the outer panel 2*a* and the inner panel.

The interlocking portion 37 is provided to extend inward in the vehicle-width direction from a rear end of the inner wall 31. The interlocking portion 37 is interlocked with a torsion spring 102 (see FIG. 2).

Once the user outside the vehicle grips the first cover member 10 and the base member 30, the first cover member 10 and the base member 30 rotate about the handle shaft 101 to be opened outward in the vehicle-width direction in a horizontal plane. The rotative force is transmitted to an unillustrated latch releasing lever via the interlocking portion 37, the torsion spring 102 (see FIG. 2), a counter weight 103 (see FIG. 2), and a rod 104 (see FIG. 2). The latch releasing lever releases a latch that is engaged with an unillustrated striker. While the latch is released, the door body 2 can be operated to be opened and closed by the user.

The base member 30 includes a seat 38 provided below the shield 34*a* to stand outward in the vehicle-width direction from the inner wall 31. The controller 70 is attached on an outer surface in the vehicle-width direction of the seat 38.

<<Reinforcement Member>>

As illustrated in FIG. 2, the reinforcement member 40 is provided in the space formed between the outer panel 2*a* and the inner panel. A front end of the reinforcement member 40 includes a first storage 41 in which a middle portion of the hinge 36 is stored. A rear end of the reinforcement member 40 includes a second storage 42 in which a middle portion of the interlocking portion 37 is stored. That is, the reinforcement member 40 is bridged between the hinge 36 and the interlocking portion 37 in the space formed between the outer panel 2*a* and the inner panel and reinforces the base member 30 by maintaining a constant distance between the hinge 36 and the interlocking portion 37. The torsion spring 102 is attached on a rear end of the reinforcement member 40.

<<Water Stop Member>>

Figure 4:
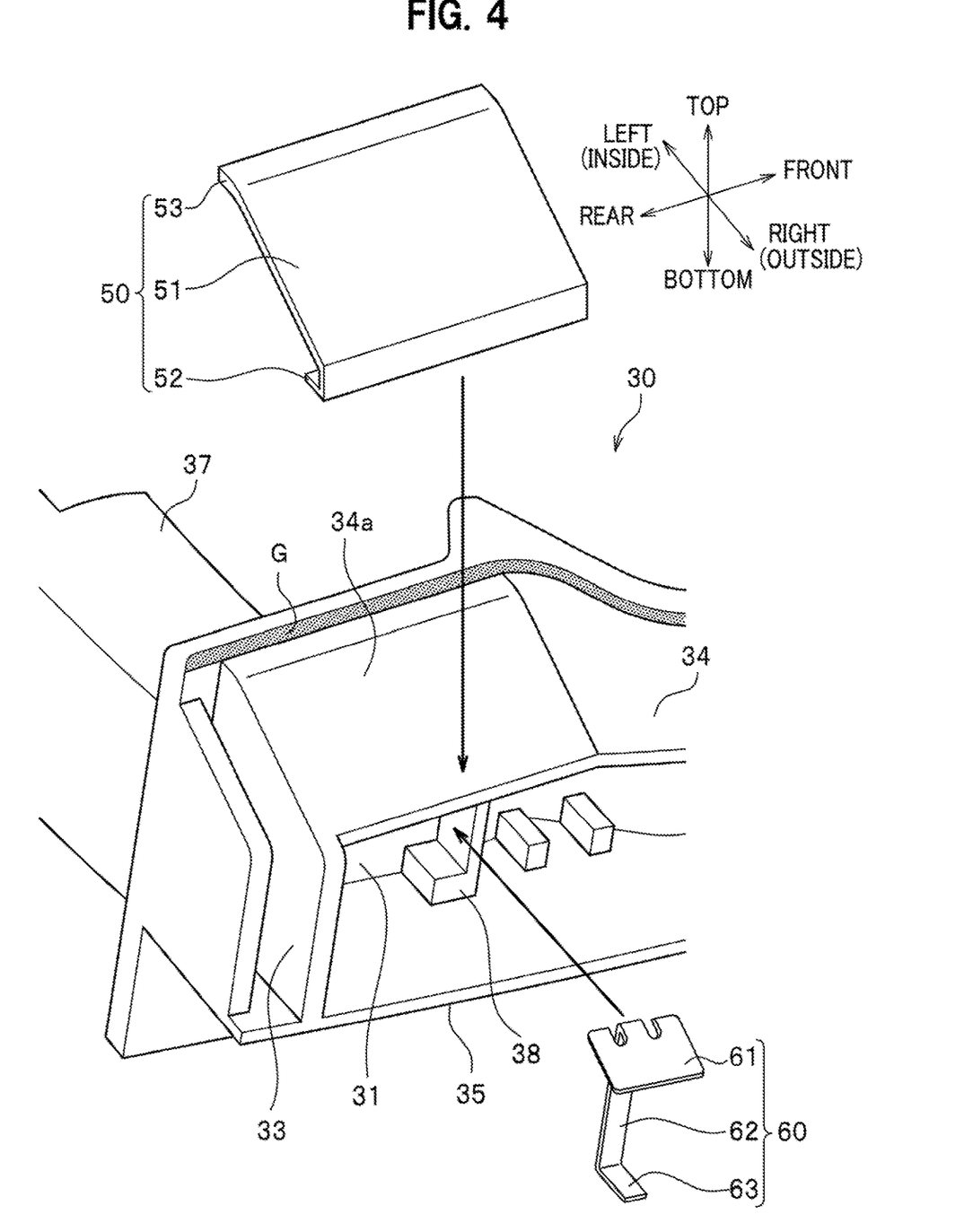
FIG. 4 is an exploded perspective view that illustrates the base member, a water stop member, and a sensor of the door structure according to the embodiment of the present invention.
Figure 5:
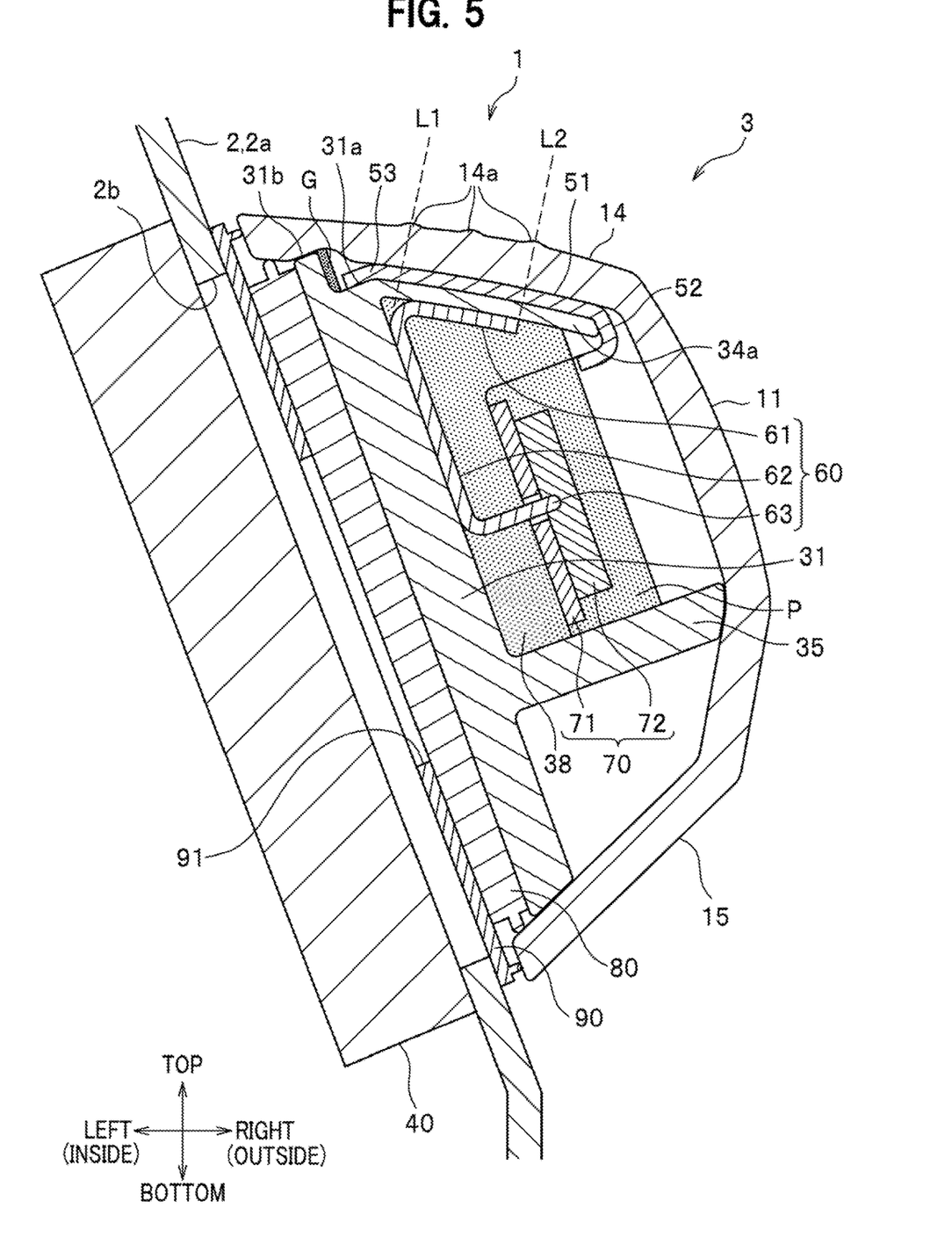
FIG. 5 is a cross-sectional view taken along V-V line in FIG. 2, which is a diagram that illustrates an inner structure of the door structure according to the embodiment of the present invention.

As illustrated in FIGS. 4 and 5, the water stop member 50 is a resin-made plate-like or sheet-like member. The water stop member 50 is inserted between the upper wall 14 of the first cover member 10 and the shield 34a and seals a space between the upper wall 14 and the shield 34a in a watertight manner. The water stop member 50 integrally includes a main body 51, an eave 52, and a flange 53.

The main body 51 is a portion along the shield 34a. A lower surface of the main body 51 is in surface contact with an upper surface of the shield 34a. An upper surface of the main body 51 is in surface contact with the lower surface of the upper wall 14 of the first cover member 10.

The eave 52 is provided to extend downward from a lower end of the main body 51. A lower end of the eave 52 has a shape winding inward in the vehicle-width direction.

The flange 53 is provided to extend inward in the vehicle-width direction from an upper end of the main body 51. A lower surface of the flange 53 is in surface contact with an upper surface of the inner wall 31.

The main body 51 of the water stop member 50 is clamped by the upper wall 14 of the first cover member 10 and the shield 34a by assembling the first cover member 10 and the base member 30 together.

<<Sensor>>

As illustrated in FIGS. 4 and 5, the sensor 60 is a sensor attached on the base member 30, which detects approach of the user outside the vehicle to the first cover member 10 or contact of the user with the first cover member 10 and outputs the detection result to the controller 70. The sensor 60 integrally includes a sensor upper wall 61, a vertical portion 62, and a connector 63.

The sensor upper wall 61 includes a portion that actually detects the approach of the user to the first cover member 10 or contact of the user with the first cover member 10, that is, a detection area of the sensor 60 (sensor electrode). An upper surface of the sensor upper wall 61 is in surface contact with the lower surface of the shield 34a.

The vertical portion 62 is provided to extend downward from an inner end in the vehicle-width direction of the sensor upper wall 61. In this embodiment, the vertical portion 62 has a vertically elongated flat-plate shape extending in a sagittal plane direction orthogonal to a right-left axis. An inner surface in the vehicle-width direction of the vertical portion is in surface contact with an outer surface in the vehicle-width direction of the inner wall 31.

The connector 63 is provided to extend outward in the vehicle-width direction from a lower end of the vertical portion 62. A tip end of the connector 63 is connected with a later-described electronic part 72 of the controller 70. That is, the sensor upper wall 61 is connected with the electronic part 72 of the controller 70 from the inside in the vehicle-width direction via the vertical portion 62 and the connector 63.

<<Controller>>

As illustrated in FIG. 5, the controller 70 includes a board 71 and the electronic part 72 implemented on the board 71. The board 71 is attached on the outer surface in the vehicle-width direction of the seat 38. The controller 70 obtains a signal from the smart key of the vehicle and the detection result of the sensor 60 and controls the lock provided in the second cover member 20 based on the obtained signal and the detection result. That is, the controller 70 unlocks the lock when the user having the smart key of the vehicle contacts the markers 14a.

Note that the sensor 60 and the controller 70 provided in the base member 30 are embedded in potting P, which is an insulating (non-conductive) transparent resin. The potting P prevents water and dust from being attached on the sensor 60 and the controller 70.

<<Stopper and Sheet Base>>

The stopper 80 and the sheet base 90 are provided on a portion corresponding to the through-hole 2b of the outer panel 2a in the openings in the inside in the vehicle-width direction of the first cover member 10 and the second cover member 20.

The stopper 80 is a metal-made or resin-made plate-like member provided to seal the openings in the inside in the vehicle-width direction of the first cover member 10 and the second cover member 20. An upper end of the stopper 80 is abutted on the lower surface of the upper wall 14 of the first cover member 10, and a lower end of the stopper 80 is abutted on the upper surface of the lower wall 15 of the first cover member 10. An outer surface in the vehicle-width direction of the stopper 80 is in surface contact with an inner surface in the vehicle-width direction of the inner wall 31 of the base member 30. The stopper 80 restricts the separation between the first cover member 10 and the base member 30 and restricts a pivoting range of the first cover member 10 and the base member 30.

The sheet base 90 is a resin-made sheet member interposed between the outer panel 2a of the door body 2 and the first cover member 10, the second cover member 20, and the base member 30. Upper and lower ends of the sheet base 90 are formed thicker than a middle portion of the sheet base 90 and seal the space between the outer panel 2a and the first cover member 10. The sheet base 90 is attached on an inner surface in the vehicle-width direction of the stopper 80 (and the first cover member 10 and the second cover member 20) with an adhesive and the like.

A through-hole 91 is formed in the sheet base 90. The stopper 80 includes an (unillustrated) engagement portion, which is provided to extend inward in the vehicle-width direction of the outer panel 2a via the through-hole 91a and the through-hole 2b and which can be engaged with an inner surface in the vehicle-width direction of the outer panel 2a.

<Relationships Between Upper Wall of First Cover Member, Water Stop Member, Shield, and Sensor Upper Wall>

As illustrated in FIG. 5, the upper wall 14 of the first cover member 10, the main body 51 of the water stop member 50, the shield (base upper wall) 34a, and the sensor upper wall 61 are parallel to each other and are inclined downward while extending outward in the vehicle-width direction. The markers 14a of the upper wall 14 are provided on an area (between a straight line L1 and a straight line L2 in FIG. 5) that coincides with the sensor upper wall 61 as seen from a direction orthogonal to the upper wall 14. As seen from the top-down direction orthogonal to the upper wall 14, the upper wall 14, the main body 51, and the shield 34a cover the sensor upper wall 61 and are provided to extend outward in the vehicle-width direction further than the sensor upper wall 61. That is, the dimensions in the front-rear direction and the vehicle-width direction of the main body 51 and the shield 34a are greater than the dimensions in the front-rear direction and the vehicle-width direction of the sensor upper wall 61.

The upper surface of the base member 30 is bonded to the lower surface of the upper wall 14 with an adhesive G. That is, a space between an upper surface (inner upper end 31a)

of the base member 30 and the lower surface of the upper wall 14 is sealed by the adhesive G.

In this embodiment, the adhesive G is the adhesive, which is applied on the upper wall 34 for attaching an inner end in the vehicle-width direction of an upper surface of the upper wall 34 of the base member 30 to the lower surface of the upper wall 14 of the first cover member 10 and which is continuously applied also on an inner side in the vehicle-width direction of the flange 53 of the water stop member 50.

The controller 70 is provided below the shield 34a and the upper wall 14. In this door structure 1, even when water enters inside the first cover member 10 from a clearance between the outer panel 2a and an upper end of the first cover member 10 and the entered water penetrates between the upper wall 14 of the first cover member and the upper end of the stopper 80, the water is stopped by the adhesive G and the water stop member 50.

The door structure 1 according to the embodiment of the present invention includes the shield 34a provided between the markers 14a and the sensor 60. With such a configuration, the shield 34a can prevent the sensor 60 from getting wet when water enters inside the first cover member 10 from the clearance between the outer panel 2a and the upper end of the first cover member 10. The shield 34a can also prevent dust from the outside from being attached on the sensor 60. Accordingly, it is possible to prevent occurrence of the sensing failure of the sensor 60 due to rainwater, dust, and the like.

The door structure 1 includes the shield 34a integrally provided on the base member 30. With such a configuration, it is possible to prevent the sensor 60 from getting wet using the simple configuration without adding other parts.

The door structure 1 includes the water stop member 50 provided between the markers 14a and the shield 34a. With such a configuration, it is possible to prevent water and dust from penetrating between the markers 14a and the shield 34a. Thus, it is possible to reliably prevent the sensor 60 from getting wet and more reliably prevent occurrence of the sensing failure of the sensor 60 due to rainwater, dust, and the like.

The upper end (inner upper end 31a) of the base member 30 of the door structure 1 is bonded to the upper wall 14 of the first cover member 10. With such a configuration, the adhesive G makes it possible to more reliably prevent entering of water and dust.

The door structure 1 has a configuration in which the sensor upper wall 61 is in surface contact with the shield 34a. With such a configuration, it is possible to improve the positioning accuracy of the sensor 60 and prevent occurrence of displacement of the detection area.

The door structure 1 has a configuration in which the sensor upper wall 61 and the controller 70 are connected with each other via the vertical portion 62 at the inside in the vehicle-width direction. With such a configuration, comparing with a configuration in which the sensor upper wall 61 and the controller 70 are connected with each other at the outside in the vehicle-width direction, it is possible to make the detection region of the sensor 60 into a necessary and sufficient compact size. Also, it is possible to apply metal decoration using plating and the like on the first cover member 10, thereby improving the design.

The door structure 1 has a configuration in which the markers 14a and the sensor upper wall 61 are provided at the position where they coincide with each other in the direction orthogonal to the upper wall 14 of the first cover member 10. With such a configuration, it is possible to make the representation of the markers 14a and the detection region of the sensor 60 substantially coincide with each other, thereby offering improved operability to the user.

In the door structure 1, the sensor 60 is stored in the base member 30. With such a configuration, it is possible to more reliably prevent the sensor 60 from getting wet and more reliably prevent occurrence of the sensing failure of the sensor 60 due to rainwater, dust, and the like.

Although the embodiment of the present invention is described as above, the present invention is not limited to the abovementioned embodiment and can be properly changed without departing from the gist of the present invention. For example, the shield 34a may be a member separated from the base member 30.

The water stop member 50 may be omitted, and the configuration may be that the upper surface of the shield 34a is in surface contact with the lower surface of the upper wall 14 of the first cover member 10. In this case, the configuration may be that the upper end of the shield 34a is bonded to the upper wall 14 of the first cover member 10 with the adhesive G.

The sensor 60 is not limited to a sensor for detecting contact of the user with the portion including the markers 14a of the first cover member 10, and the sensor 60 may be a sensor for detecting approach of the user to the markers 14a.

The door structure of the present invention can also be applied to a sliding door that opens and closes an opening formed on a side surface of the vehicle body and to a door that opens and closes a rear opening formed on a rear surface of the vehicle body (what is called a hatch-type back door).

REFERENCE SIGNS LIST 1 door structure
3 outer handle
10 first cover member (cover member)
30 base member
34a shield (base upper wall)
50 water stop member
60 sensor
61 sensor upper wall
62 vertical portion
70 controller
G adhesive

The invention claimed is:
1. A door structure of a vehicle body including an outer handle, comprising:
 a cover member that forms an outer surface of the outer handle;
 a sensor that detects approach of a user to the cover member or contact of the user with the cover member;
 a marker that is provided on a portion of an outer surface of the cover member coinciding with a detection area of the sensor;
 a base member on which the sensor is attached;
 a shield that extends outward in a vehicle width direction from an upper end part of the base member, the shield being provided in a position coinciding with the detection area; and a water stop member that is interposed between the marker and the shield, wherein the water stop member is interposed between an inner surface of an area of the cover member on which the marker is provided and an upper surface of the shield, the water stop member being in surface contact with the inner surface of the area of the cover member and the upper surface of the shield, the sensor includes a sensor upper wall forming the detection area, an upper surface of the sensor upper wall is in surface contact with a lower surface of the shield, the water stop member includes an eave provided to extend downward from a lower end of the water stop member and to wind inward in the vehicle-width direction so as to grasp a portion of the shield in order to mount the water stop member to the shield, and a lower end of the eave is positioned lower than the sensor upper wall.

2. The door structure according to claim 1, wherein an upper end of the base member is bonded to the cover member.

3. The door structure according to claim 1, further comprising:

a controller to which a detection result of the sensor is inputted, wherein the sensor includes a vertical portion that is provided to extend downward from an inner end in a vehicle-width direction of the sensor upper wall, and the vertical portion is connected with the controller.

4. The door structure according to claim 1, wherein the marker is provided at a position coinciding with the sensor upper wall in a direction orthogonal to an upper wall of the cover member.

5. The door structure according to claim 1, wherein the base member includes an inner wall and a base upper wall that is provided to extend outward in a vehicle-width direction from an upper end of the inner wall, the shield is formed as the base upper wall, and the sensor is provided on outer side in the vehicle-width direction of the inner wall and below the base upper wall.

6. The door structure according to claim 1, wherein the marker is provided at a position coinciding with the sensor upper wall in a direction orthogonal to an upper wall of the cover member.

* * * * *